United States Patent
Hessling et al.

(10) Patent No.: US 12,044,306 B2
(45) Date of Patent: Jul. 23, 2024

(54) PLANETARY GEARBOX HAVING IMPROVED LUBRICANT TRANSFER, DRIVE TRAIN, WIND TURBINE AND INDUSTRIAL APPLICATION

(71) Applicant: Flender GmbH, Bocholt (DE)

(72) Inventors: Pascal Hessling, Bocholt (DE); Michael Vennemann, Stadtlohn (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/021,337

(22) PCT Filed: Aug. 12, 2021

(86) PCT No.: PCT/EP2021/072493
§ 371 (c)(1),
(2) Date: Feb. 14, 2023

(87) PCT Pub. No.: WO2022/043080
PCT Pub. Date: Mar. 3, 2022

(65) Prior Publication Data
US 2023/0296169 A1    Sep. 21, 2023

(30) Foreign Application Priority Data
Aug. 24, 2020 (EP) .................................... 20192317

(51) Int. Cl.
*F16H 57/04* (2010.01)
*F03D 15/00* (2016.01)
(Continued)

(52) U.S. Cl.
CPC ......... *F16H 57/0486* (2013.01); *F03D 15/00* (2016.05); *F03D 80/70* (2016.05);
(Continued)

(58) Field of Classification Search
CPC ...... F16H 57/0486; F16H 1/46; F16H 57/043; F16H 57/0472; F16H 57/0479;
(Continued)

(56) References Cited

U.S. PATENT DOCUMENTS

| | | |
|---|---|---|
| 10,337,602 B2 | 7/2019 | Hepermann |
| 2017/0286572 A1 | 10/2017 | Hershey et al. |
| 2017/0307064 A1 | 10/2017 | Riedisser et al. |

FOREIGN PATENT DOCUMENTS

| | | | |
|---|---|---|---|
| DE | 102009040479 A1 * | 4/2010 | ............. F03D 15/00 |
| EP | 3 001 071 A1 | 3/2016 | |

(Continued)

OTHER PUBLICATIONS

International Search Report issued on Oct. 19, 2021 by the European Patent Office in International Application PCT/EP2021/072493.

*Primary Examiner* — Derek D Knight
(74) *Attorney, Agent, or Firm* — Henry M. Felereisen LLC

(57) ABSTRACT

A planetary gearbox includes a first planetary stage with a component, a sun gear, and a planet gear meshing with the sun gear via a toothing system, a second planetary stage, and a lubricant transfer device arranged between the first planetary stage and the second planetary stage. The lubricant transfer device includes a discharge component arranged in a co-rotating manner on a component of the second planetary stage, and a receiving component designed to receive lubricant and arranged in a co-rotating manner on the component of the first planetary stage. A lubricant conduit communicates with the lubricant transfer device and is configured to extend over an entire axial extent of a tooth engagement region of the sun gear of the first planetary stage (Continued)

radially within the toothing system of the sun gear with the planet gear of the first planetary stage.

15 Claims, 2 Drawing Sheets

(51) Int. Cl.
    *F03D 80/70*     (2016.01)
    *F16H 1/28*     (2006.01)
    *F16H 1/46*     (2006.01)
    *F16H 3/44*     (2006.01)
    *F16H 57/02*     (2012.01)

(52) U.S. Cl.
    CPC ............. *F03D 80/707* (2023.08); *F16H 1/28* (2013.01); *F16H 1/46* (2013.01); *F16H 3/44* (2013.01); *F16H 57/02* (2013.01); *F16H 57/043* (2013.01); *F16H 57/0472* (2013.01); *F16H 57/0479* (2013.01); *F05B 2260/40311* (2013.01); *F16H 2057/02078* (2013.01)

(58) Field of Classification Search
    CPC ........... F16H 2057/02078; F03D 80/70; F05B 2260/40311
    See application file for complete search history.

(56) References Cited

FOREIGN PATENT DOCUMENTS

| | | | |
|---|---|---|---|
| WO | WO 2012/055832 A1 | 5/2012 | |
| WO | WO 2020/001942 A1 | 1/2020 | |

\* cited by examiner

PLANETARY GEARBOX HAVING IMPROVED LUBRICANT TRANSFER, DRIVE TRAIN, WIND TURBINE AND INDUSTRIAL APPLICATION

CROSS-REFERENCES TO RELATED APPLICATIONS

This application is the U.S. National Stage of International Application No. PCT/EP2021/072493 filed Aug. 12, 2021, which designated the United States and has been published as International Publication No. WO 2022/043080 A1 and which claims the priority of European Patent Application, Serial No. 20192317.4, filed Aug. 24, 2020, pursuant to 35 U.S.C. 119(a)-(d).

BACKGROUND OF THE INVENTION

The invention relates to a planetary gearbox having improved lubricant transfer and to a drive train equipped with such a planetary gearbox. The invention also relates to a wind turbine having such a drive train and to an industrial application with a planetary gearbox according to the invention. The invention also relates to a computer program product for simulating an operating behavior of such a planetary gearbox.

Patent specification EP 3 001 071 B1 discloses a planetary gearbox comprising a planetary stage which is supplied with lubricant. A lubricant distribution conduit is formed between a slide bushing, which is connected to a housing wall, and a web of a planet carrier.

WO 2012/055832 A1 and U.S. Pat. No. 10,337,602 B2 each disclose a planetary gearbox having a lubricant conduit which is routed through rotating components of various planetary stages, wherein a lubricant transfer device comprising a discharge component and a relatively rotatable receiving component is provided between two components that rotate relative to one another, wherein the lubricant conduit and the associated lubricant transfer device is formed in an axial region between the sun gears of the successive planetary stages.

Increasing demands are being placed on planetary gearboxes in terms of performance and compactness. A reliable and low-loss transport of lubricant to the corresponding components of the gearbox is essential for this. At the same time, simple production of such planetary gearboxes is sought. The object on which the invention is based is to provide a planetary gearbox having a lubricant supply which offers an improvement in at least one of the points described.

SUMMARY OF THE INVENTION

The object is achieved by means of a planetary gearbox as set forth hereinafter. Preferred configurations are specified in the dependent claims and the following description, which may in each case individually or in combination represent an aspect of the invention. If a feature is presented in combination with another feature, this serves only for simplified presentation of the invention and Is in no way Intended to mean that this feature cannot also be a development of the invention without the other feature.

The planetary gearbox has a first and a second planetary stage. The first and second planetary stage are connected in a torque-transmitting manner to one another and are arranged adjacent to one another. The first and second planetary stage each have a ring gear, a planet carrier with rotatable planet gears and a sun gear as components. In each of the first and second planetary stage, at least one of these components is in the form of a rotating component which rotates during operation of the planetary gearbox. The planetary gearbox also comprises a lubricant transfer device which is arranged between the first and second planetary stage. The lubricant transfer device is configured to transfer a lubricant from the second planetary stage to the first planetary stage. For this purpose, the lubricant transfer device comprises a discharge component, by way of which the lubricant can be transported to a receiving component. The discharge component and the receiving component are configured to be complementary to one another in this regard. The discharge component is arranged in a co-rotating manner on a component of the second planetary stage. The discharge component is connected in a rotationally fixed manner to a rotating component of the second planetary stage and accordingly follows the existing rotational movement during operation of the planetary gearbox. As a result, the discharge component can be of compact configuration and at the same time allows for low-leakage transfer of lubricant from the second to the first planetary stage. The first planetary stage can consequently be supplied with lubricant from the second planetary stage, as a result of which there is no need for bores in housing walls for lubricant conduits. In particular, there is no need for additional lubricant supplies from the outside to the first planetary stage and/or bores by way of which the rotating components of the second planetary stage are bypassed. Furthermore, the planetary gearbox may be in the form of a sequential planetary gearbox or in the form of a planetary gearbox with power split between the planetary stages.

In addition, the receiving component is arranged in a co-rotating manner on a component of the first planetary stage. The receiving component serves to receive the lubricant discharged by the discharge component and is connected in a rotationally fixed manner to the component of the first planetary stage, which is a rotating component. Accordingly, the receiving device follows a rotational movement in the first planetary stage. Furthermore, the receiving component and the discharge component may rotate relative to one another in relation to a main axis of rotation of the planetary gearbox during operation of the planetary gearbox. The relative rotation between the discharge component and the receiving component is relatively small, such that even simple seals offer an adequate sealing effect for low-leakage operation. Consequently, the lubricant transfer device can be produced in a simple manner with available seals that are tried-and-tested. In addition, the discharge component and the receiving component can have reduced dimensions and thus be of space-saving configuration and be manufactured cost-effectively.

The planetary gearbox also has a lubricant conduit that communicates with the lubricant transfer device. Provision is made here for the lubricant conduit to run over the entire axial extent of a tooth engagement region of a sun gear of the first planetary stage radially within a toothing system of the sun gear with at least one planet gear of the first planetary stage. Instead of an essentially radially running lubricant conduit, which has sub-conduits branching off in different axial directions to the respective component to be lubricated, in particular planet gear pins and/or planet gears provided on the respective planet gear pins, the lubricant conduit can extend essentially over a large part of the axial extent of the first planetary gear stage. Here, use is made of the knowledge that, in a multi-stage planetary gearbox, the respective subsequent planetary stage is fitted to the respective preceding planetary stage via an axial relative movement and may be inserted partially into the preceding planetary stage, for example by means of a long hub of the planet carrier of the subsequent planetary stage, said long hub possibly forming a sun shaft of the preceding planetary stage. As a result, a rather disk-like main region, in particular a web, of the respective planet carrier is provided on the axial side pointing away from the subsequent planetary stage, while this planet carrier generally has, on the axial side pointing toward the subsequent planetary stage, a larger central opening into which the subsequent planetary stage and suitable bearings can be inserted more easily during assembly. As a result of the lubricant conduit which extends over the entire axial extent of the tooth engagement region of the sun gear of the first planetary stage, the lubricant conduit can be routed from the disk-like main region of the planet carrier of the subsequent planetary stage to the disk-like main region of the planet carrier of the preceding planetary stage. In particular, the lubricant conduit may connect several series-connected planetary stages to one another, in that the lubricant conduit can be routed from the disk-like main region of the planet carrier of the subsequent planetary stage via a hub of this planet carrier to a disk-like main region of the planet carrier of the preceding planetary stage, and so on. Lubrication of all the planet gears of a planetary gearbox comprising several planetary stages can thus be achieved inexpensively and reliably with a low outlay in terms of design, in particular on the basis of a modular principle for the various planetary stages. Preferably, the lubricant transfer device may be provided in each case at the transition of the lubricant conduit between the respective planetary stages, said lubricant transfer device between the respective pair of planetary stages preferably being of identical and/or similar design, for example in the form of a proportionally larger or smaller version, and particularly preferably being of identical design. The production costs can be reduced further as a result.

The lubricant conduit may, for example, be supplied with lubricant from a pitch tube, which is in particular inserted radially within. The pitch tube or an annular gap delimited by the pitch tube is not understood to be part of the lubricant conduit here. The lubricant conduit rather concerns sections that are produced by machining, in particular by drilling, and that communicate with one another and that are introduced in the material of the respective rotating component of the respective planetary stage, the lubricant transfer device also forming part of the lubricant conduit. The lubricant conduit is in particular formed exclusively in the material of load-dissipating rotating components of the various planetary stages plus the lubricant transfer device. A bridging of the axial distance of the planet gear of the first planetary stage is thus effected by way of an, in particular load-dissipating, rotating component of the first planetary stage or the second planetary stage and not by way of a generally fixed pitch tube. An axial extent of a pitch tube can be reduced and/or minimized as a result.

The lubricant conduit may be formed in or on a component of the second planetary stage, which extends axially through a tooth engagement region of the first planetary stage. The tooth engagement region is be an axial portion of the first planetary stage, in which a planet gear meshes with a sun gear and/or a ring gear of the first planetary stage. The lubricant conduit may consequently run past the tooth engagement region in the axial direction. This makes it possible for installation space to be utilized in a radially inner region of the planetary gearbox in the region around the main axis of rotation. The installation space thus kept free is easily accessible as a clear space. Lubricant conduits or lubricant transport devices located radially further inward are unnecessary. This in turn allows the planet gears to have an increased diameter, or the sun gear to have a reduced diameter. This results in more design freedom for the diameter ratios in the respective planetary stage, and therefore a wider range of static transmission ratios can be achieved in the corresponding planetary stage. The claimed planetary gearbox thus makes it possible, for example, to achieve an increased static transmission ratio in the first planetary stage. As a result, the second planetary stage can be of smaller, more compact and more weight-saving design. The claimed planetary gearbox therefore offers an increased mass-specific power density. A lubricant conduit which is attached to the component of the second planetary stage may be, for example, in the form of a pipeline or ring conduit. A pipeline avoids the production of a long bore. Precise production becomes all the more difficult the longer a bore is.

In particular, the lubricant conduit within the lubricant transfer device is deflected, in the flow direction, between an axial flow direction and a radial flow direction, wherein in particular the lubricant conduit leads into the discharge component in the axial direction and exits the receiving component in the radial direction. This makes it possible for a deflection, in particular of essentially 90°, to be cost-effectively formed either in the discharge component or in the receiving component or on the contact surfaces of the discharge component and the receiving component, said contact surfaces being movable relative to one another and being directed toward one another. Intersecting bores that are blocked on one side for the deflection of the lubricant conduit are avoided. Instead, it is possible to replace an end of a bore of the lubricant conduit, said end otherwise having to be blocked by a plug, with the lubricant transfer device and to save on a plug. The lubricant conduit is preferably formed exclusively by unblocked through-bores, blind bores and the at least one lubricant transfer device.

The sun gear is preferably provided in a relatively rotatable or rotationally fixed manner on a hub of a planet carrier of the second planetary stage, wherein the lubricant conduit within the hub passes through the tooth engagement region of the sun gear and the lubricant transfer device is positioned downstream of the hub. As a result, the lubricant conduit does not have to be routed through the sun gear, which is shorter in the axial direction. Instead, the lubricant conduit is routed through the hub of the planet carrier of the subsequent planetary stage, said hub being significantly longer compared with the axial extent of the sun gear. The lubricant conduit may run in the radial direction at a distance from the sun gear within the respective planet carrier of the preceding, in particular first, planetary stage and the subsequent, in particular second, planetary stage. Since the hub of the planet carrier of the second planetary stage represents a rotating component of the second planetary stage, which may also be inserted into the first planetary stage within a rotating component of the first planetary stage, the lubricant transfer device is in particular provided downstream of the lubricant of the lubricant conduit, said lubricant flowing from the second planetary stage to the first planetary stage. The lubricant transfer device can thus be positioned in the middle within the preceding, in particular first, planetary stage in a space-saving manner.

However, it is also possible for the sun gear to be fastened in a rotationally fixed manner to a sun gear shaft of the first planetary stage, wherein the lubricant conduit within the sun gear shaft passes through the tooth engagement region of the sun gear and the lubricant transfer device is positioned upstream of the sun gear shaft. As a result, the lubricant conduit does not have to be routed through the sun gear, which is shorter in the axial direction. Instead, the lubricant conduit is routed through the sun gear shaft of the preceding planetary stage, said sun gear shaft being significantly longer compared with the axial extent of the sun gear. The lubricant conduit may run in the radial direction at a distance from the sun gear within the respective planet carrier of the preceding, in particular first, planetary stage and the subsequent, in particular second, planetary stage and be connected to one another by way of the sun gear shaft. Since the sun gear shaft of the first planetary stage represents a rotating component of the first planetary stage, which may also be inserted into the second planetary stage within a rotating component of the second planetary stage, the lubricant transfer device is in particular provided upstream of the lubricant of the lubricant conduit, said lubricant flowing from the second planetary stage to the first planetary stage. The lubricant transfer device can thus be positioned in the middle within the subsequent, in particular second, planetary stage in a space-saving manner.

Particularly preferably, the lubricant conduit is routed both to a planet gear pin, which is inserted in a rotatable or rotationally fixed manner in a planet carrier, of the first planetary stage and to a planet gear pin, which is inserted in a rotatable or rotatably fixed manner in a planet carrier, of the second planetary stage. Provision is in particular made for the lubricant conduit to terminate at the planet gear pin of the first planetary stage at an axial distance from a planet gear, which is provided on the planet gear pin of the first planetary stage, of the first planetary stage, and/or for the lubricant conduit to terminate at the planet gear pin of the second planetary stage at an axial distance from a planet gear, which is provided on the planet gear pin of the second planetary stage, of the second planetary stage. The lubricant conduit running within the disk-like web of the respective planet gear carrier may terminate in the axial direction at the respective planet gear pin without it being necessary for the lubricant conduit within the planet carrier to be deflected toward the planet gear. The planet gear pin may be received in the planet carrier with a corresponding amount of play, such that the elastic deformation of the planet gear pin during ongoing operation allows the lubricant to be conveyed from the lubricant conduit along the planet gear pin to the planet gear which is in particular relatively rotatably mounted on the planet gear pin. In particular, the planet gear pin has channels, grooves or the like running in the axial direction, such that the lubricant exiting the lubricant conduit outside the planet carrier can be conveyed along the planet gear pin easily and with a sufficient mass flow to the associated planet gear.

In addition, the lubricant transfer device may be arranged in the axial direction, that is to say along the main axis of rotation of the planetary gearbox, on a side, which faces away from the second planetary stage, of a planet gear of the first planetary stage. As a result, the lubricant can be transported over an increased distance in a component of the second planetary stage, which in turn ensures essentially leak-free transport of the lubricant. Furthermore, the lubricant in the first planetary stage has to be transported merely over a reduced axial distance. This leads to a structural simplification in the first and second planetary stage. Furthermore, such a positioning of the lubricant transfer device allows easy accessibility from the first planetary stage, which in turn increases the ease of assembly and maintenance of the claimed planetary gearbox.

Furthermore, the discharge component may be arranged at an end, which faces the first planetary stage, of a hub of a planet carrier of the second planetary stage. A sun gear of the first planetary stage may be arranged on such a hub, which is also referred to as a long hub. In particular, the discharge device may be attached to an end face of the hub, said end face facing the first planetary stage, as a result of which the accessibility of the lubricant transfer device is improved. This achieves increased ease of assembly and maintenance. The discharge device may be hydraulically connected to a lubricant conduit, which is essentially in the form of a bore in the axial direction through the hub. Such a bore can be produced in a simple manner, for example by a single drilling process or by a casting of the planet carrier. As an alternative or In addition, the lubricant conduit may also be in the form of a pipeline. The lubricant conduit may be formed in a radially inner region of the hub, said radially inner region being subjected to less mechanical stress during operation of the planetary gearbox than a radially outer region. As a result, an installation space that cannot be used in the case of gearbox stages according to the prior art can be used in a technical manner. This achieves improved utilization of the existing installation space, which in turn means that the claimed planetary gearbox can be of compact configuration. In particular, the discharge component may be formed in one piece with the hub of the planet carrier of the second planetary stage.

In a further embodiment of the claimed planet carrier, the receiving component may be arranged on a web, which faces away from the second planetary stage, of a planet carrier of the first planetary stage, that is to say in the region of the designated web. In the region of the web of the planet carrier of the first planetary stage, said web facing away from the second planetary stage, there is also a pin bore for a planet gear pin, on which a planet gear of the first planetary stage is rotatably arranged. The web extends essentially in the radial direction in relation to the main axis of rotation. The lubricant received by the receiving component can therefore be conducted through a lubricant conduit in the radial direction through the web to one of the planet gear pins. The lubricant conduit in the radial direction can in turn be produced in a simple manner, for example by means of a single bore or by means of a casting of the planet carrier of the first planetary stage. The designated web of the planet carrier of the first planetary stage is also easily accessible, which simplifies maintenance. In particular, seals that bring about a sealing effect between the receiving component and the discharge component can be replaced with reduced effort. This makes it possible to ensure an effective sealing effect in the lubricant transfer device in a cost-effective manner over the entire service life of the planetary gearbox. Likewise, radial and axial offsets between the first and second planetary stage can be compensated with minimal leakage. In addition, no heavy moving masses act on the seals during assembly, which prevents damage to the seals. Furthermore, the discharge component and the receiving component can be of relatively compact and lightweight configuration, allowing for precise manual assembly. The assembly forces that occur are relatively low, with the result that damage to the seals during assembly can be avoided. This in turn makes it possible, for example, to use a seal made of mechanically sensitive materials, such as polytetrafluoroethylene. Similarly to the ease of assembly, the ease of maintenance is also increased or maintenance is made possible in the first place.

Furthermore, in the claimed planetary gearbox, the lubricant transfer device may be configured to compensate for a radial, an axial offset and/or angular offset between the discharge component and the receiving component. The terms "axial" and "radial" refer in this case to the main axis of rotation of the planetary gearbox. An angular offset may be caused by a tilting of the corresponding components. In particular, a leakage loss at the lubricant transfer device is avoided or reduced if a radial offset, an axial offset and/or an angular offset occurs between the components of the first and second planetary stage to which the receiving device or the discharge device are attached. The claimed planetary gearbox thus makes it possible, for example, to mount the planet carrier of the first and/or second planetary stage in a movable manner. In this way, constraining forces on the planet carriers and the toothing system can be avoided. The claimed planetary gearbox is therefore adaptable for a wide range of applications, is robust against adverse operating conditions and offers reduced leakage losses.

In the case of the claimed planetary gearbox, the lubricant transfer device may have an elastically contacting seal, a labyrinth seal, a gap seal, a bushing and/or a sealing ring. An elastic contacting seal, such as a shaft sealing ring or a seal based on the principle of a piston sealing ring, provides a good sealing effect during rotation and when at a standstill and is available in a variety of sizes and shapes. A labyrinth seal provides an essentially contactless seal, and therefore mechanical losses at the lubricant transfer device during operation are avoided. A bushing which be produced, for example, from bronze or some other soft metal. Gap seals also offer a good sealing effect. The use of gap seals is made possible by the compact design of the claimed planetary gearbox. In particular, the leakage losses that occur with a gap seal are reduced to a practicable level in the claimed planetary gearbox. With a bushing, a good sealing effect can be achieved in the lubricant transfer device in a compact and cost-effective manner. A sufficient service life for the bushing can be achieved by selecting a suitable material. A sealing ring, which may for example be in the form of an O-ring, offers a good sealing effect and can be exchanged in a cost-effective manner. A combination of different seals may also be arranged on the lubricant transfer device in the claimed planetary gearbox. The seal can thus be easily adapted to the operating requirements at hand, and therefore the claimed solution can be transferred to planetary gearboxes of different sizes and with different design concepts.

In a further embodiment of the claimed planetary gearbox, a gap may be formed between the discharge component and the receiving component. The gap allows the relative rotation between the discharge component and the receiving component to be effected without contact, that is to say without friction. At the same time, the leakage loss through the gap can be designed in a precise manner, such that it can be kept within an acceptable range. Furthermore, the gap between the receiving component and the discharge component allows smooth assembly.

As an alternative or in addition, a centrifugal seal may be arranged between the discharge component and the receiving component. The centrifugal seal may be open with contact at a standstill and be configured to have a sealing action with contact above a design rotational speed. Since the conveyance of lubricant is also interrupted when the planetary gearbox is at a standstill, an open, that is to say non-sealing centrifugal seal can be readily tolerated. The conveyance of lubricant also increases as the rotational speed of the planetary gearbox increases. Accordingly, the higher the rotational speed of the planetary gearbox, and thus the demands on the centrifugal seal, the more pronounced the sealing action of the centrifugal seal. As a result, an automatically regulating seal is realized.

Furthermore, the claimed planetary gearbox may also have at least a third planetary stage, which is arranged downstream of the second planetary stage. Correspondingly to the first and second planetary stage, a lubricant transfer device may also be arranged between the second and third planetary stage, by means of which lubricant can be transferred from the third to the second planetary stage. The lubricant transfer device between the second and third planetary stage may be configured according to at least one of the embodiments outlined above. In addition, the two lubricant transfer devices may be of identical construction or implement different embodiments. The claimed planetary gearbox thus has a simple and efficient supply of lubricant. Overall, the length of lubricant conduits present in the planetary gearbox is minimized. This reduces pressure losses in the lubricant, that is to say hydraulic losses. This makes it possible to ensure the supply of lubricant for a complex planetary gearbox comprising three or more planetary stages using a simple lubricant supply means, in particular a lubricant pump with a relatively low delivery rate. This in turn means that at least three-stage planetary gearboxes can be produced in a simple and economically viable manner. Such three-stage planetary gearboxes are known, for example, from the international application WO 2020/001942 A1. The disclosure content of WO 2020/001942 A1 is incorporated into the present application by reference. Furthermore, in the claimed planetary gearbox, a sun shaft of the third planetary stage may have a reduced inner diameter. As a result, an outer diameter of the third planetary stage is also reduced.

The underlying object is also achieved by means of a drive train according to the invention, which is suitable for use in a wind turbine. The drive train comprises a rotor shaft which is connected in a torque-transmitting manner to a gearbox. The drive train also comprises a generator which is connected in a torque-transmitting manner to the gearbox. According to the invention, the gearbox is in the form of a planetary gearbox according to one of the embodiments outlined above. In addition, the planetary gearbox and the generator may also be configured to be integrated into one another, that is to say to be in the form of a generator gearbox. The planetary gearbox according to the invention also further simplifies and accelerates the assembly of the drive train according to the invention.

Equally, the object described at the outset is achieved by means of a wind turbine according to the invention. The wind turbine comprises a nacelle on which a multi-blade rotor is rotatably arranged. The multi-blade rotor is connected in a torque-transmitting manner to a rotor shaft, which forms part of a drive train of the wind turbine. According to the invention, the drive train is configured according to one of the embodiments outlined above.

The object is also achieved by means of an industrial application according to the invention. The industrial application comprises a drive unit which may be in the form, for example, of an electric motor, a combustion engine or a hydraulic motor. The drive unit provides drive power which is supplied to a gearbox. For this purpose, the drive unit is connected in a torque-transmitting manner to the gearbox. The gearbox, in turn, is connected in a torque-transmitting manner to an output unit, to which the drive power is made available at a modified rotational speed and taking mechanical losses into account. The output unit may be in the form of a mechanical application, such that the industrial application as a whole is, for example, a mill, a vertical mill, a sugar mill, a cement mill, a rock crusher, a conveyor belt, a pump, a roller press, a slat conveyor, a tube mill, a rotary kiln, a slewing gear, a stirring unit, a lifting device, a waste compactor or a scrap compactor. According to the invention, the gearbox is in the form of a planetary gearbox configured according to one of the embodiments outlined above.

Furthermore, the object described above is achieved by means of a computer program product according to the invention, which is configured to simulate an operating behavior of a planetary gearbox which is arranged, that is to say essentially installed, in a wind turbine. For this purpose, the computer program product may have a physics model in which an image of the planetary gearbox can be displayed. The physics model may have simulation routines, by means of which the kinematics of the planetary gearbox and/or its components can be mapped. Likewise, the physics model may be suitable for replicating a fluid-dynamic behavior of an operating medium, such as a lubricant. Equally, the physics model may be configured to simulate a thermal behavior of the planetary gearbox, its components, and the operating medium individually or in interaction with one another. Furthermore, the physics model may be suitable for simulating an oscillation behavior of the components based on the structural dimensions of the components of the planetary gearbox and data about their respective materials. The computer program product may comprise a data interface for receiving data, by means of which a prevailing operating situation of the planetary gearbox is specified. Likewise, the computer program product may have a data interface for outputting simulation results which are to be output to a user and/or which are to be forwarded to other simulation-oriented computer program products. The computer program product may be in the form of what is known as a digital twin. Such digital twins are described in more detail, for example, in the laid-open specification US 2017/286572 A1. The disclosure content of US 2017/286572 A1 is incorporated into the present application by reference. According to the invention, the planetary gearbox, the operating behavior of which can be simulated by the computer program product, is configured according to one of the embodiments outlined above. The claimed planetary gearbox can thus be fitted in a multiplicity of wind turbines. In particular, assembly or maintenance of the planetary gearbox can be simulated in order to be able to fully exploit the technical advantages of the claimed planetary gearbox in the wind turbine.

BRIEF DESCRIPTION OF THE DRAWING

The invention will be explained in more detail below with reference to individual embodiments in figures. The figures are to be read in a mutually complementary manner insofar as the same reference designations in different figures have the same technical meaning. The features of the individual embodiments can also be combined with one another. Furthermore, the embodiments shown in the figures can be combined with the features outlined above. Specifically.

DETAILED DESCRIPTION OF PREFERRED EMBODIMENTS

Figure 1:
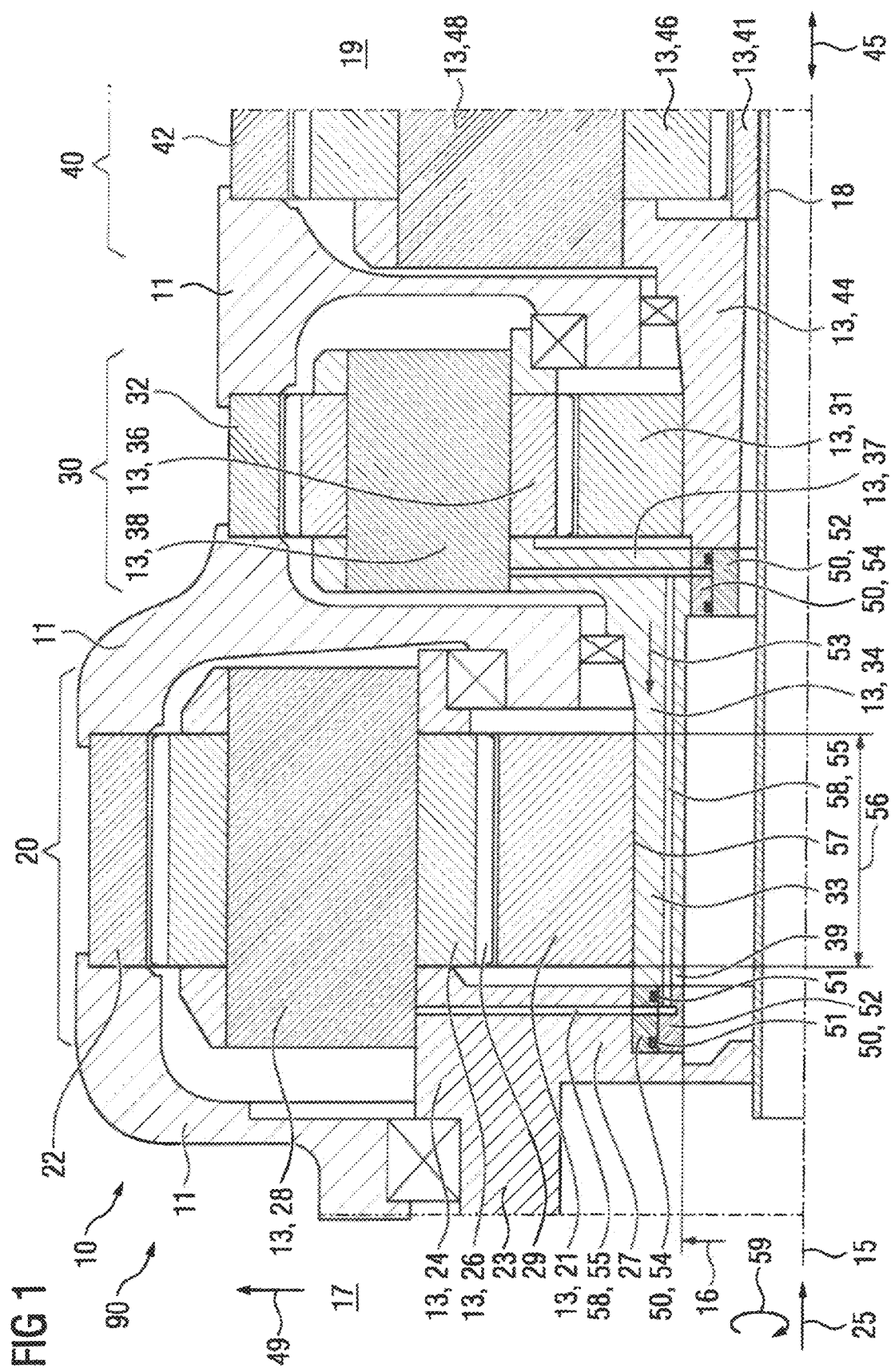
FIG. 1 schematically shows an embodiment of the claimed planetary gearbox in longitudinal section.

FIG. 1 schematically illustrates a claimed embodiment of the claimed planetary gearbox 10 in longitudinal section. The planetary gearbox 10 comprises a first planetary stage 20, which is followed by a second planetary stage 30 and a third planetary stage 40. The planetary stages 20, 30, 40 are connected to one another by housing components 11 which are releasably connected to the ring gears 22, 32, 42 of the respective planetary stages 20, 30, 40. The first, second and third planetary stage 20, 30, 40 each have a planet carrier 24, 34, 44, to which a plurality of planet gear pins 28, 38, 48 are in each case fastened. A respective planet gear 26, 36, 46 is rotatably arranged on the planet gear pins 28, 38, 48. In each of the planetary stages 20, 30, 40, the planet gears 26, 36 mesh with a sun gear 21, 31. In the third planetary stage 40, the planet gears 46 mesh with a sun shaft 41, which is provided with a toothing system and is thus functionally also a sun gear. The sun gears 21, 31, or the sun shaft 41, the planet gears 26, 36, 46 and the planet carriers 24, 34, 44 belong to the rotating components 13 of the planetary gearbox 10. The planet carriers 24, 34, 44 and the sun gears 21, 31, 41 rotate about a main axis of rotation 15 of the planetary gearbox 10 during operation, as a result of which drive power 25 is transported from a drive side 17 to an output side 19 with conversion of torque and rotational speed. The drive power 25 is supplied via a hub 23 which is formed in one piece with the planet carrier 24 of the first planetary stage 20.

The planet carrier 34 of the second planetary stage 30 has a hub 33 which extends in the direction of the first planetary stage 20. The hub 33 is connected in a torque-transmitting manner to the sun gear 21 of the first planetary stage 20 via a shaft-hub connection 57. A discharge component 52 of a lubricant transfer device 50 is arranged at an end 39 of the hub 33, said end facing away from the second planetary stage 30 and being illustrated on the left in FIG. 1. The lubricant transfer device 50 also comprises a receiving component 54 which is connected to the first planetary stage 20. The receiving component 54 is attached to the planet carrier 24 of the first planetary stage 20. The receiving component 54 is fastened in the region of a web 27 of the planet carrier 24, such that lubricant 55 can be transferred from the discharge component 52 to the receiving component 54. In this case, the lubricant 55 is conveyed along a flow direction 53. Due to the fact that the discharge component 52 is fastened to the planet carrier 34 of the second planetary stage 30, it co-rotates with the planet carrier 34 during operation. Similarly, the receiving component 54 co-rotates with the planet carrier 24 of the first planetary stage 20. Owing to the different rotational speeds of the planet carrier 24 and the sun gear 21 of the first planetary stage 20, there is also a relative rotation 59 between the receiving component 54 and the discharge component 52. The lubricant transfer device 50 has seals 51, which are in the form of sealing rings, and is therefore suitable for transferring the lubricant 55 with minimal leakage loss even in the presence of the relative rotation 59. The lubricant 55 is conveyed in the axial direction 45 through a lubricant conduit 58 which is essentially in the form of a bore through the hub 33 of the planet carrier 34 of the second planetary stage 30. The lubricant 55 is deflected by the discharge component 52 and the receiving component 54 and transported via a lubricant conduit 58 in the planet carrier 24 of the first planetary stage 20 to a planet gear pin 28 received therein. As a result, the lubricant 55 can be supplied to a plain bearing between the planet gear pin 28 and the planet gear 26 in the first planetary stage 20. The lubricant conduit 58, which is hydraulically connected to the receiving component 54, is essentially in the form of a bore in the radial direction 49, which extends through the web 27 of the planet carrier 24 on the drive side 17.

The lubricant conduit 58, which is formed in the hub 33 of the planet carrier 34 of the second planetary stage 30, extends, viewed along the axial direction 45, through a tooth engagement region 56 in which toothing systems 29 of the planet gears 26 and the sun gear 21 of the first planetary stage 20 mesh. Within the tooth engagement region 56 there is also a region in which the shaft-hub connection 57 between the sun gear 21 of the first planetary stage 20 is connected to the planet carrier 34 of the second planetary stage 20. Due to the use of the lubricant transfer device 50, the planet carrier 24 of the first planetary stage 20 has an increased inner diameter 16 in which a pitch tube 18 is arranged. As a result, the first planetary stage 20 is easily accessible, which simplifies assembly and maintenance work. In addition, the lubricant transfer device 50 is suitable for compensating for an axial offset, a radial offset, and/or an angular offset between the planet carriers 24, 34 of the first and second planetary stage 20, 30. As a result, the planetary gearbox 10 shown in FIG. 1 is robust against temporarily excessive stresses and has only minimal leakage losses of lubricant 55 at the lubricant transfer device 50. Overall, the transport of lubricant 55 from the second planetary stage 30 to the first planetary stage 20 is also simplified in that the length of the lubricant conduits 58 in the first and second planet carriers 24, 34 is reduced. As a result, hydraulic losses in the lubricant conduits 58, that is to say essentially pressure losses, can be reduced, which in turn allows the use of a simple lubricant pump, which is not shown in more detail in FIG. 1.

The planetary gearbox 10 in FIG. 1 also has a third planetary stage 40 which is provided with a discharge component 52 of a lubricant transfer device 50. The corresponding receiving component 54 is attached in a co-rotating manner to the planet carrier 34 of the second planetary stage 30. The lubricant transfer device 50 between the second and third planetary stage 30, 40 is constructed and arranged in a corresponding manner to the lubricant transfer device 50 between the first and second planetary stage 20, 30. The technical aspects outlined above therefore also apply to the lubricant device 50 between the second and third planetary stage 30, 40. The planetary gearbox 10 is also reproduced in a simulated manner in a computer program product 90, with the result that the operating behavior of the planetary gearbox 10 can be computationally adjusted.

Figure 2:
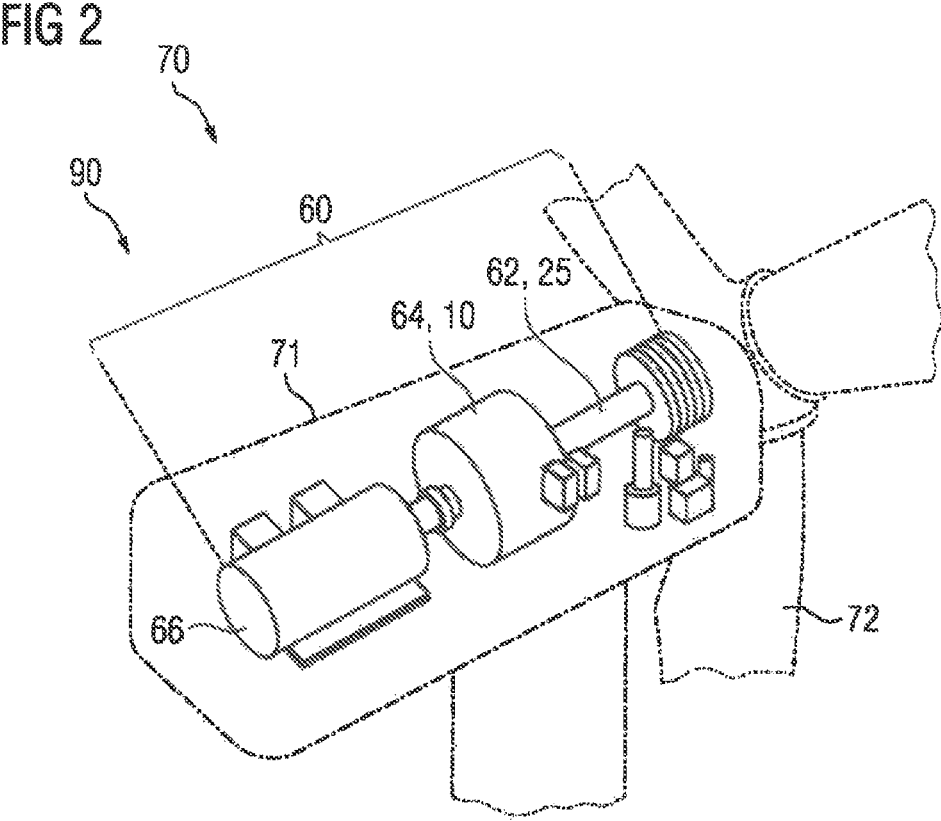
FIG. 2 shows a sectional oblique view of an embodiment of the claimed wind turbine.

An embodiment of the claimed wind turbine 70 with a claimed drive train 60 is illustrated in FIG. 2 in a sectional oblique view. The drive train 60 is arranged in a nacelle 71 of the wind turbine 70 and has a rotor shaft 62 which is connected in a torque-transmitting manner to the multi-blade rotor 72. A rotation of the multi-blade rotor 72 is transmitted as drive power 25 via the rotor shaft 62 to a gearbox 64, which is in turn connected in a torque-transmitting manner to a generator 66 which also forms part of the drive train 60. According to the invention, the gearbox 64 is in the form of a planetary gearbox 10 according to one of the embodiments described above. Furthermore, the operating behavior of the gearbox 64, that is to say of the planetary gearbox 10, can be simulated by a computer program product 90. For this purpose, the computer program product 90 comprises an image of the planetary gearbox 10 and is suitable, among other things, for processing a rotation of the multi-blade rotor 72 to replicate operating conditions of the wind turbine 70.

Figure 3:
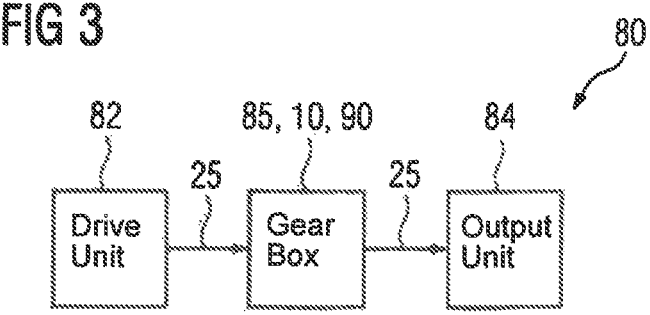
FIG. 3 schematically shows the construction of an embodiment of the claimed industrial application.

FIG. 3 schematically shows the construction of an embodiment of the claimed industrial application 80, which comprises a drive unit 82 and an output unit 84. The drive unit 82 provides a drive power 25 which is transported to the output unit 84 via a gearbox 85. The drive unit 82 may be in the form of an electric motor, a combustion engine or a hydraulic motor. The output unit 84 may be in the form of a mechanical application, such that the industrial application 80 is, for example, a mill, a vertical mill, a sugar mill, a cement mill, a rock crusher, a conveyor belt, a pump, a roller press, a slat conveyor, a tube mill, a rotary kiln, a slewing gear, a stirring unit, a lifting device, a waste compactor or a scrap compactor. According to the invention, the gearbox 85 is in the form of a planetary gearbox 10 according to one of the embodiments described above.

What is claimed is:

1. A planetary gearbox, comprising:
a first planetary stage comprising a first component, a sun gear, and a planet gear meshing with the sun gear via a toothing system;
a second planetary stage comprising a second component;
a lubricant transfer device arranged between the first planetary stage and the second planetary stage, said lubricant transfer device comprising a discharge component arranged in a co-rotating manner on the second component of the second planetary stage, and a receiving component designed to receive lubricant and arranged in a co-rotating manner on the first component of the first planetary stage; and
a lubricant conduit configured to extend over an entire axial extent of a tooth engagement region of the sun gear of the first planetary stage radially within the toothing system of the sun gear with the planet gear of the first planetary stage.

2. The planetary gearbox of claim 1, wherein the lubricant conduit is deflected in a flow direction of the lubricant within the lubricant transfer device between an axial flow direction and a radial flow direction.

3. The planetary gearbox of claim 2, wherein the lubricant conduit leads into the discharge component of the lubricant transfer device in the axial direction and exits the receiving component of the lubricant transfer device in the radial direction.

4. The planetary gearbox of claim 1, wherein the second planetary stage comprises a planet carrier including a hub, said sun gear connected to the hub of the planet carrier of the second planetary stage for rotation in relation to the hub or in rotationally fixed manner on the hub, said lubricant conduit designed to pass within the hub through the tooth engagement region of the sun gear, said lubricant transfer device positioned downstream of the hub.

5. The planetary gearbox of claim 1, wherein the first component of the first planetary stage comprises a planet carrier, the first planetary stage comprising and a planet gear pin which is inserted in a rotatable or rotationally fixed manner in the planet carrier of the first planetary stage, and wherein the second component of the second planetary stage comprises a planet carrier, the second planetary stage comprising and a planet gear pin which is inserted in a rotatable or rotationally fixed manner in the planet carrier of the second planetary stage, said lubricant conduit routed to both the planet gear pin of the first planetary stage and the planet gear pin of the second planetary stage.

6. The planetary gearbox of claim 5, wherein the lubricant conduit terminates at the planet gear pin of the first planetary stage at an axial distance from a planet gear provided on the planet gear pin of the first planetary stage and/or the lubricant conduit terminates at the planet gear pin of the second planetary stage at an axial distance from a planet gear provided on the planet gear pin of the second planetary stage.

7. The planetary gearbox of claim 1, wherein the first planetary stage comprises a planet carrier including a web which faces away from the second planetary stage, said receiving component arranged on the web of the planet carrier of the first planetary stage.

8. The planetary gearbox of claim 1, wherein the lubricant transfer device is configured to compensate for a radial, an axial offset and/or angular offset between the discharge component and the receiving component.

9. The planetary gearbox of claim 1, wherein the lubricant transfer device comprises a labyrinth seal, a bushing and/or a sealing ring.

10. The planetary gearbox of claim 1, wherein the discharge component and the receiving component are arranged such as to form a gap there between.

11. The planetary gearbox of claim 1, further comprising a third planetary stage.

12. A drive train for a wind turbine, said drive train comprising:
a planetary gearbox comprising a first planetary stage comprising a first component, a sun gear, and a planet gear meshing with the sun gear via a toothing system, a second planetary stage comprising a second component, a lubricant transfer device arranged between the first planetary stage and the second planetary stage, said lubricant transfer device comprising a discharge component arranged in a co-rotating manner on the component of the second planetary stage, and a receiving component designed to receive lubricant and arranged in a co-rotating manner on the component of the first planetary stage, and a lubricant conduit configured to extend over an entire axial extent of a tooth engagement region of the sun gear of the first planetary stage radially within the toothing system of the sun gear with the planet gear of the first planetary stage;
a rotor shaft connected in a torque-transmitting manner to the planetary gearbox; and
a generator connected in a torque-transmitting manner to the planetary gearbox.

13. A wind turbine, comprising:
a nacelle;
a drive train designed in a form as set forth in claim 12; and
a multi-blade rotor connected in a torque-transmitting manner to the drive train and rotatably arranged on the nacelle.

14. An industrial application, comprising:
a drive unit;
an output unit; and
a gearbox configured to connect the drive unit and the output unit in a torque-transmitting manner to one another, said gearbox designed in a form of a planetary gearbox as set forth in claim 1.

15. A computer program product embodied on a non-transitory computer readable medium comprising commands which, when executed by a computer, cause the computer to simulate an operating behavior of a planetary gearbox which is arranged in a drive train of a wind turbine and configured as set forth in claim 1.

* * * * *